United States Patent [19]

Saitoh

[11] Patent Number: 4,611,339
[45] Date of Patent: Sep. 9, 1986

[54] METHOD AND APPARATUS FOR REMOVAL OF IMPURE GASES AT TIME OF SCRAP PREHEATING

[75] Inventor: Kazunori Saitoh, Tokyo, Japan

[73] Assignee: Pennsylvania Engineering Corporation, Pittsburgh, Pa. ; a part interest

[21] Appl. No.: 543,974

[22] Filed: Nov. 14, 1983

[51] Int. Cl.⁴ ............................................. F27D 13/00
[52] U.S. Cl. ........................................... 373/80; 373/9; 432/179
[58] Field of Search ................... 373/8, 9, 80; 432/28, 432/72, 179, 180

[56] References Cited

U.S. PATENT DOCUMENTS

| | | | |
|---|---|---|---|
| 4,099,019 | 7/1978 | Horibe et al. | 373/9 |
| 4,156,102 | 5/1979 | Mainot | 373/9 |
| 4,242,532 | 12/1980 | Squibbs | 373/9 |
| 4,437,186 | 3/1984 | Inai | 373/9 |

Primary Examiner—Roy N. Envall, Jr.
Attorney, Agent, or Firm—Fred Wiviott

[57] ABSTRACT

A method of preheating scrap metal with impure gases discharging from a metallurgical vessel includes the steps of conducting a first portion of the gases to a container of scrap metal, contacting the scrap metal with the gases for preheating the same whereby additional impurities are generated, withdrawing the impure gases after contact with the scrap metal and mixing the same with a second portion of impure gases from the metallurgical vessel, thermally cracking the mixture in a combustion chamber to remove impurities and thereafter removing particular matter from the gases prior to the discharge to the atmosphere.

9 Claims, 3 Drawing Figures

METHOD AND APPARATUS FOR REMOVAL OF IMPURE GASES AT TIME OF SCRAP PREHEATING

BACKGROUND OF THE INVENTION

This invention relates to a method and apparatus for preheating scrap metal with metalurgical furnace waste gases and more particularly to the purification and removal of such gases.

Electric arc furnaces employed for steel production are relatively large in size and produce large quantities of poluting gases. In order to prevent the direct discharge of such gases into the atmosphere, dust collecting equipment are normally installed in connection with electric arc furnaces. With the recent sharp rise in power costs, these electric arc furnace discharge gases have been employed for preheating scrap as an energy saving measure. This is accomplished by directly contacting scrap to be preheated with the high temperature waste gases evacuated from the furnace.

When electric arc furnace waste gases have been employed for scrap preheating, secondary pollution has occurred as a result of the incomplete combustion of the impurities and oily substances adhering to the surface of the scrap and which are released during preheating.

SUMMARY OF THE INVENTION

The invention comprises the method of preheating scrap with electric arc furnace waste gases and including the steps of conducting a first portion of the arc furnace waste gas through a preheating inlet duct to the scrap preheating equipment. After the scrap has been preheated, the gases are conducted to a combustion chamber where the impure gases containing the partially combusted substances released at the time of scrap preheat are treated by thermal cracking.

The scrap preheating equipment is connected by a preheating inlet duct to the electric arc furnace fume collector and by an outlet duct and a gas volume control damper to a combustion chamber. As an alternate embodiment of the invention, the outlet duct may be connected to the inlet duct between the combustion chamber and a gas volume control damper connected to the electric arc furnace gas collector.

DETAILED DESCRIPTION OF THE PREFERRED EMBODIMENT

Figure 1:
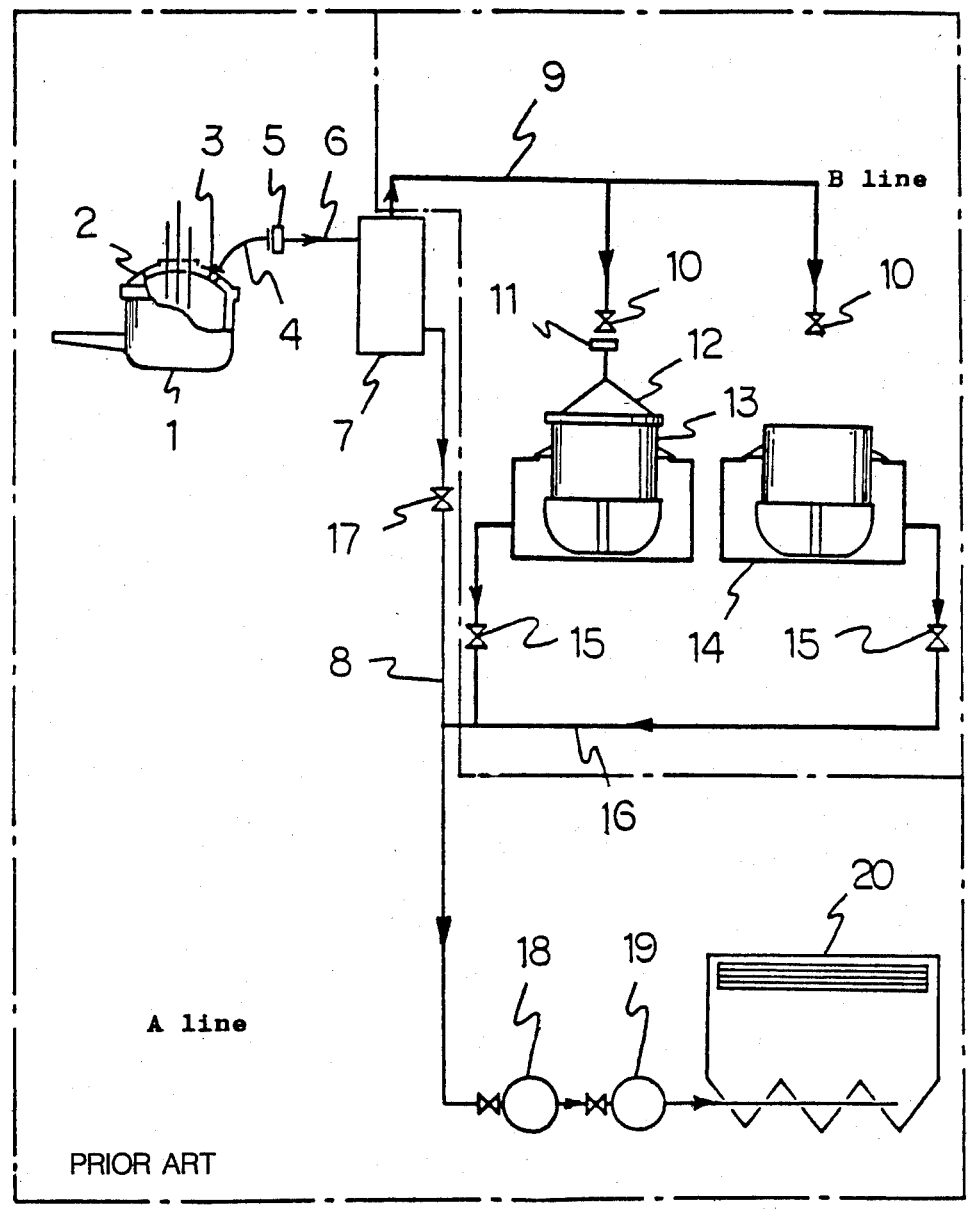
FIG. 1 schematically illustrates one prior art scrap preheating system.

The prior art scrap preheating system shown in FIG. 1 includes the combination of scrap preheating equipment, identified in the drawing as Line B, connected in a bypass relation to an electric arc furnace dust collecting system, identified in the drawing as Line A. In particular, an electric arc furnace 1 has a cover 2 and a waste gas suction opening which may be formed in the cover 2 by drilling. A water cooled elbow 4 is connected by a water cooled sleeve 5 to a water cooled inlet duct 6 of a combustion chamber 7. A water cooled outlet duct 8 from chamber 7 includes a gas volume control damper 17 and is connected to a dust collector 20. Also connected in duct 8 are a booster fan 18 which is required for intensifying pressure following the installation of the scrap preheating equipment. In addition, a dust collecting fan 19 is provided for drawing the waste gases into a dust collector 20. A bypass line or preheating inlet duct 9 is connected to a pair of switching on/off dampers 10 which are in turn connectable to an inlet sleeve 11 of the cover 12 of a scrap bucket 13 which may be disposed in one of the pair of preheating pits 14. Volume control dampers 15 connect each of the preheating pits 14 to an outlet duct 16 which is connected to the combustion chamber outlet duct 8.

In operation of the prior art system shown in FIG. 1, the high temperature waste gases from the electric arc furnace 1 will preheat scrap disposed within the scrap bucket 13. Thereafter, the waste gas will pass through the bypass line 16 to its junction with duct 8. By adjusting the opening of the preheating outlet damper 15 and the direct suction gas volume control damper 17, the volume of gas flowing in the preheating conduit 9 and the suction line 8 can be controlled.

In the prior art system just discussed, the impurities and oily substances adhering to the surface of the scrap will only be partially combusted by the waste gas during the scrap preheating step. A foul smelling white smoke containing unburned substances is thus produced and is delivered to the water cooled duct 8 through the preheating outlet duct 16. This results in a undesirable foul smelling white gas discharging from the dust collector 20 into the atmosphere.

The system in accordance with the preferred embodiment of the invention resolves the problem of incomplete combustion of the impurities and oily substances included with the scrap by conducting a portion of the arc furnace waste gas directly to the scrap preheating equipment by a preheating inlet duct which branches off the water cooled duct coupled to the furnace suction opening. After the waste gas has heated the scrap, it is conducted to a combustion chamber where thermal cracking of the impure gasses containing unburned substances will occur. This alleviates the problem of the foul odor associated with prior art systems.

Figure 2:
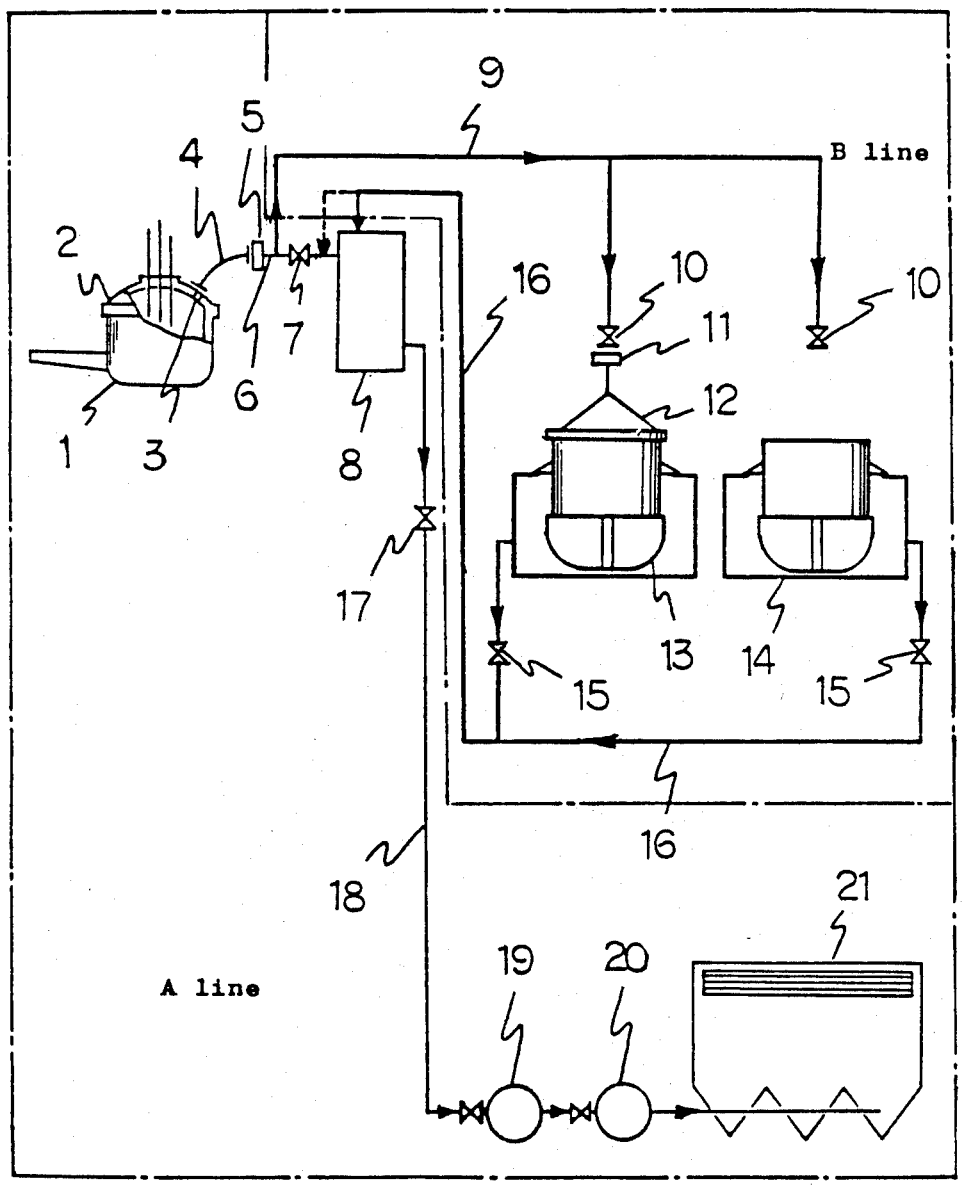
FIG. 2 schematically illustrates the preferred embodiment of the scrap preheating system in accordance with the invention.

The preferred embodiment of the invention will now be discussed in relation to FIG. 2. Here an electric arc furnace 1 includes a furnace cover 2 which may freely be moved between open and closed positions. A suction hole 3 is drilled into the furnace cover 2 and is connected to one end of a water cooled elbow 4. A water cooled duct 6 is connected at one end to the elbow 4 through a water cooled sleeve 5 and at its other end to a combustion chamber 8. A preheating inlet duct 9 branches off from the duct 6 at a point between a gas volume control damper 7 and the water cooled sleeve 5. Duct 9 is connected to a pair of on/off switching dampers 10. Each damper 10 is adapted to be coupled to the inlet sleeve 11 of the cover 12 of a scrap preheating bucket 13 disposed within a preheating pit 14. Each of the preheating pits 14 are connected through gas volume control dampers 15 to a preheating outlet duct 16 which may be connected to the combustion chamber 8 at a point close to the inlet water cooled duct 6 or to the duct itself. A water cooled outlet duct 18 connects the combustion chamber 8 through a gas volume control damper 17 to a dust collector 21. As in the prior art systems, a booster fan 19 and a dust collecting fan 20 are connected in duct 18.

The preexisting equipment identified as the A line consists of the furnace 1, the water cooled elbow 4, the combustion chamber 8, the gas volume control damper 17, the water cooled duct 18, the dust collecting fan 20 and the dust collector 21. To this is added the preheating equipment identified as B line. In addition, a direct suction gas volume control damper 7 is connected at some point in the water cooled duct 6 between the bypass line 9 for the scrap preheating equipment and the combustion chamber 8.

Gas exiting the furnace 1 through elbow 4 passes into the duct 9 and flows to one of the preheating inlet switching on/off dampers 10. The gas then flows through inlet sleeve 11 to the scrap preheating bucket 13. After contact with the scrap, the gas flows through the gas volume control damper 15 to the preheating outlet duct 16. The gas is then returned either to the water cooled duct 6 between the combustion chamber 8 and the damper 7 or directly to the chamber 8.

During furnace operation, booster fan 19 and the dust collector fan 20 are activated causing the high temperature furnace waste gas to flow into conduit 6 where it splits into a first portion flowing through the conduit 9 to the scrap preheaters and a second portion flowing to the combustion chamber 8. The proportion of the gases flowing through each path can be suitably controlled by adjusting the opening of the gas volume control damper 7. In order to effectively preheat the scrap and to insure against secondary pollution, it is necessary to adjust the ratio of the waste gas flowing to the bypass line 9 and to the combustion chamber 8 by adjusting the volume control damper 7 and taking into consideration the layout of the equipment installed. In this manner, the waste gas drawn into the bypass line 9 will be at a fairly high temperature so that as it passes through the scrap preheating bucket 13, it will raise the temperature of the scrap to an extent sufficient to provide substantial energy savings in electric arc furnace operation. When the waste gas preheats the scrap, impurities and oily substances which adhere to the surface of the scrap will be partially combusted so that the waste gas and unburned substances will become a source of foul smelling gases. If these unburned substances are carried away by the waste gases and then discharged into the atmosphere, a source of secondary pollution will be created.

Only partial combustion of the waste gasses occurs as a result of the low temperature inside the preheating outlet duct 16. In order to prevent the discharge of these materials into the atmosphere, thermal cracking is performed by mixing the partially combusted material with high temperature gases from the arc furnace 1. This is accomplished by allowing the waste gasses discharging from the preheating pit 14 and containing unburned substances to remain in contact for a suitable time with the high temperature gas. In actual tests performed, the desired effect was obtained with 0.5 seconds of contact. This mixing and contact is accomplished by conducting the waste gases containing unburned substances to that part of the water cooled duct 6 beyond the gas volume control damper 7 or directly to the combustion chamber 8. In either case, the gas will be allowed to contact the high temperature waste gas from the arc furnace 1. As a result of this contact, thermal cracking is achieved.

As in the prior art system, two scrap preheating buckets 13 are arranged in parallel so that while scrap preheating occurs in one bucket, the scrap for the second bucket may be prepared. In order to prevent the suction of outside air from the standby pit 14 into the preheating outlet duct 16, the gas volume control damper 15 which is connected to the standby pit 14 will be closed. In this manner, the gas volume control damper 15 will also perform the switching off operation for the preheating outlet circuit.

Figure 3:
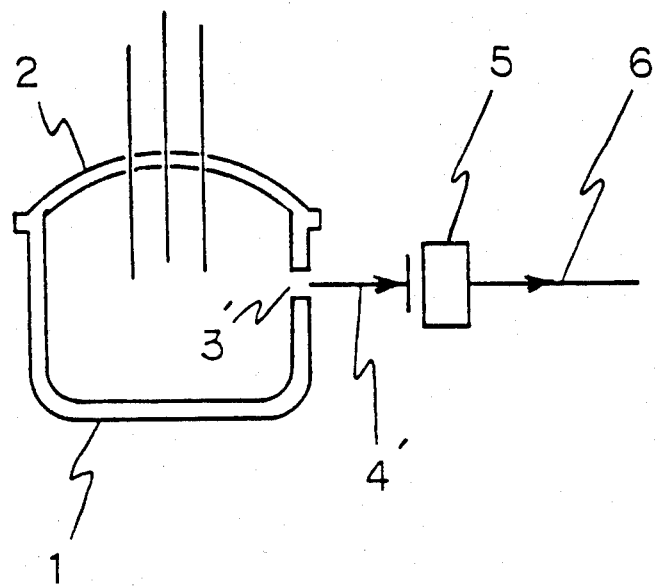
FIG. 3 schematically illustrates an arc furnace fume collector.

FIG. 3 shows the case of suction of the waste gas on the furnace side from the gas suction hole 3' drilled into the furnace wall of the electric arc furnace 1. While only the furnace itself is shown in FIG. 3, the system according to the invention can be used in this case exactly the same as in the embodiment of FIG. 2.

As discussed above, in the system according to the invention, low temperature waste gas containing unburned substances is withdrawn from the preheating pit 14 and mixed with high temperature waste gas in the combustion chamber 8. This results in thermal cracking of the unburned substances which may then be passed through the dust collector 21 for discharge into the atmosphere. The prior art problem of secondary pollution and unpleasant odor is thereby resolved. Moreover, in accordance with the invention, the waste gas to be conducted to the scrap preheating equipment is taken from the water cooled duct 6 at a point fairly close to the electric arc furnace 1. As a result, the waste gas passing through the preheating equipment will have a relatively high temperature so that a high scrap preheating effect is achieved. In addition, the system according to the invention will require only minor modification to existing ductwork. In particular, all that will be required is to branch the preheating inlet duct 9 from the water cooled duct 6 and connect the preheating outlet duct 16 to either the water cooled duct 6 or the combustion chamber 8.

We claim:

1. A method of preheating scrap with impure gases containing particulates and discharging from a metallurgical furnace, the method comprising the steps of:

conducting at least a portion of said furnace gases directly from said furnace to a container of scrap metal for preheating the same wherein additional impurities are generated for entrainment by said gases as a result of the contact between said furnace gases and said scrap metal, withdrawing said gases from said container after contact with said scrap metal and conducting the same to a first treatment vessel for reducing the level of said impurities therein, withdrawing gases from said first treatment vessel after the reduction of said impurities and conducting the same to a second treatment vessel for removing particulates therefrom, said furnace gases being conducted from said furnace to said container without mixing the same with gases withdrawn from said container.

2. The method set forth in claim 1 wherein said first treatment vessel is a combustion chamber and thermally cracking said impurities in said first treatment vessel whereby the level thereof is reduced.

3. The method set forth in claim 2 and including the steps of conducting a first portion of the impure gases directly from said metallurgical furnace to said container of scrap metal, conducting a second portion of said impure gases directly to said combustion chamber, and mixing the impure gases conducted from said container of said scrap metal with the second portion of said impure gases removed from said metallurgical furnace, and conducting said mixture to said combustion chamber.

4. The method set forth in claim 3 wherein said second portion of the impure gases from said metallurgical furnace and the impure gases from said container of scrap are allowed to mix for about 0.5 seconds prior to the delivery thereof to said combustion chamber.

5. The method set forth in claim 4 wherein there are two containers of scrap metal, the additional steps of conducting the first portion of the impure gases to the first scrap metal container and charging scrap into the second container, terminating the delivery of said impure gases to said first container after the scrap therein has been preheated and commencing the delivery of said combustion products to said second container for preheating the scrap therein and discharging the heated scrap from the first container.

6. The method set forth in claim 1 and including the steps of conducting a first portion of the impure gases directly from said metalurgical furnace to said container of scrap metal, conducting a second portion of said impure furnace gases directly to said treatment vessel, and mixing the impure gases withdrawn from said container of scrap metal with the second portion of said impure gases removed from said metallurgical furnace, and conducting said mixture to said treatment vessel.

7. The method set forth in claim 1 and including the steps of conducting a first portion of the impure gases directly from said metalurgical furnace to said container of scrap metal, conducting a second portion of said impure furnace gases directly to said treatment vessel, and mixing in a combustion chamber the impure gases conducted from said container of scrap metal with the second portion of said impure gases removed from said metallurgical furnace.

8. Apparatus for preheating scrap metal with impure gases containing particulates and discharging from a metallurgical furnace,
    a container for scrap metal having an inlet and an outlet,
    first means for dividing the gases discharging from said furnace into first and second portions,
    means for conducting said first portion of the gases discharging from said metallurgical furnace to the inlet of said container,
    a combustion chamber for burning waste gases and having an inlet and an outlet,
    second means for conducting said second portion of said gases to the inlet of said combustion chamber,
    means for conducting waste gases from the outlet of said container to the inlet of a combustion chamber,
    particulate removing means for removing particulates from waste gases, and
    means for conducting combustion products from the outlet of the combustion chamber to the particulate removal means.

9. The apparatus set forth in claim 8 and including mixing means and third means for conducting the impure gases from the scrap metal container to said mixing means and additional means for conducting the gas mixture from said mixing means to said combustion chamber.

* * * * *